United States Patent [19]

Kuchta

[11] Patent Number: 5,609,082
[45] Date of Patent: Mar. 11, 1997

[54] LUBRICATION AID FOR TREATING CUTTING BLADE AND SHARPENER

[75] Inventor: Richard Kuchta, Tolland, Conn.

[73] Assignee: Gerber Garment Technology, Inc., Tolland, Conn.

[21] Appl. No.: 416,520

[22] Filed: Apr. 4, 1995

Related U.S. Application Data

[63] Continuation of Ser. No. 37,077, Mar. 25, 1993, abandoned.

[51] Int. Cl.⁶ ........................................... B26D 7/08
[52] U.S. Cl. .................... 83/13; 83/168; 83/174; 451/45; 451/420
[58] Field of Search ................... 83/13, 168, 169, 83/174, 174.1; 30/123.3, 123.4; 451/45, 420

[56] References Cited

U.S. PATENT DOCUMENTS

| | | | |
|---|---|---|---|
| 532,471 | 1/1895 | Mershon | 83/168 |
| 1,375,989 | 4/1921 | Williams | 83/169 X |
| 1,700,275 | 1/1929 | Willett | 83/169 |
| 1,958,912 | 5/1934 | Clark | 83/169 X |
| 3,557,848 | 1/1971 | Wright | 83/168 X |
| 3,830,122 | 8/1974 | Pearl | 83/941 X |

Primary Examiner—Rinaldi I. Rada
Assistant Examiner—Clark F. Dexter
Attorney, Agent, or Firm—McCormick, Paulding & Huber

[57] ABSTRACT

A method and apparatus deals with a cutter used for cutting a fabric or other material sheet having a layer of active or activatable adhesive disposed on it and provides a lubricant in gel form to be applied to the surfaces of the cutting implement to keep these surfaces free from adhesive otherwise building up on them. The lubricant in the preferred embodiment is a compound of silicone and polytetrafluoroethylene. Further, a second lubricant is provided which is to be applied to the surfaces of the sharpener to keep the sharpening surfaces free from adhesive.

17 Claims, 3 Drawing Sheets

5,609,082

LUBRICATION AID FOR TREATING CUTTING BLADE AND SHARPENER

This application is a continuation of application, Ser. No. 08/037,077, filed on Mar. 25, 1993, now abandoned.

BACKGROUND OF THE INVENTION

The present invention resides in a method and apparatus for cutting sheet material having at least one layer of adhesive bonded to it and cut either as a ply or a stack of plies of material during a cutting operation, and deals more particularly with an improvement in such an apparatus and method whereby a means is provided for treating the knife blade of a cutter as cuts are made during a cutting operation to prevent adhesive buildup on the blade surfaces and on grinding stones used to sharpen the blade intermittently during the cutting operation.

In cutters of the type wherein a blade is reciprocated to cause cutting of the cloth material along a path in which it is moved, the reciprocation rate of a knife blade may be such that it produces enough heat in a cutting operation to cause the cut material to be fused, such as in the case where a vinyl material is being cut. In U.S. Pat. No. 3,830,122 issued to Pearl on Aug. 20, 1974, this problem is addressed and is remedied by providing a liquid coolant to the cutter head thereby conducting heat away from the blade to effect better performance of the cutting machine. However, in the case where cutting occurs in materials, such as used today in the automobile manufacturing industry wherein a fabric or vinyl sheet having an adhesive backing is cut, the blade is dulled by adhesive which adheres to its surfaces as cutting progresses. Also, in cutting materials, such as trilaminates, wherein a powdered fusible adhesive is interposed between two outer plies, adhesive which is either active or caused to be activated by the effects of friction generated by the blade deposit on the knife edge thereby dulling it and decreasing knife performance in the cutting operation.

This problem is not just limited to build up of adhesive on the cutting blades. Cutter heads which employ a reciprocating blade suspended from a carriage moved over a layup, also employ grinding stones which are carried by the carriage and rotate about given axes when brought into engagement with the knife blade to sharpen it. One such example of a sharpening apparatus of this type is disclosed in U.S. Pat. No. 4,033,214 issued to David Pearl on Jul. 5, 1977. As disclosed in this patent, the blade is sharpened by bringing the rotating grinding stones into engagement with the knife blade while reciprocating the blade to sharpen it along its length. During this process however, any adhesive previously adhering to the blade is transferred to the grinding stones and thereafter becomes lodged in the grinding surfaces of the stones, thereby reducing the abrading effectiveness of the sharpening mechanism.

Accordingly is an object of the present invention to provide a means in a cutter whereby the blade of the cutter is continuously treated to prevent the adhesion and subsequent build up of adhesive or other like material on the blade surface.

It is another object of the present invention to provide a means employed in a cutter of the aforementioned type wherein the blade is reciprocated through a stroke and wherein the means for treating the blade is provided as a lubricating means located along the stroke of the blade such that with each reciprocation of the knife blade, the lubricant is applied and is subsequently wiped from the blade surfaces which cut the material.

It is yet a further object of the present invention to provide a lubricant of the aforementioned type and cause the lubricant to be applied to the grinding stones of a cutter head to dissolve adhesive transferred thereon from the blade and/or keep clean the grinding surfaces to avoid build up of an adhesive or other foreign material which otherwise would be transferred from the blade to the grinding stone.

SUMMARY OF INVENTION

This invention relates to an apparatus and method for treating the knife blade of a cutting device used for the cutting of sheet material having a layer of adhesive bonded to it. The apparatus for this purpose provides a frame for carrying the blade for cutting of the sheet material and carries a reservoir means secured to said frame and juxtaposed relative to the knife blade for holding a means therein for treating the surfaces of the knife blade to keep them free of adhesive. The means contained in the reservoir means for treating the surfaces of the knife blade further includes lubricant means for coating the surfaces of the knife blade with a lubricant to keep the blade surfaces free of adhesive otherwise adhering to them. The lubricant means is provided in gel form in accordance with one aspect of the invention. Means are provided for applying lubricant otherwise collecting in the reservoir means onto at least a portion of the surfaces of said cutting blade.

The invention further resides in a method for treating the cutting surfaces of a knife blade to keep these surfaces free of adhesive build up.

BRIEF DESCRIPTION OF THE PREFERRED EMBODIMENT

Figure 1:
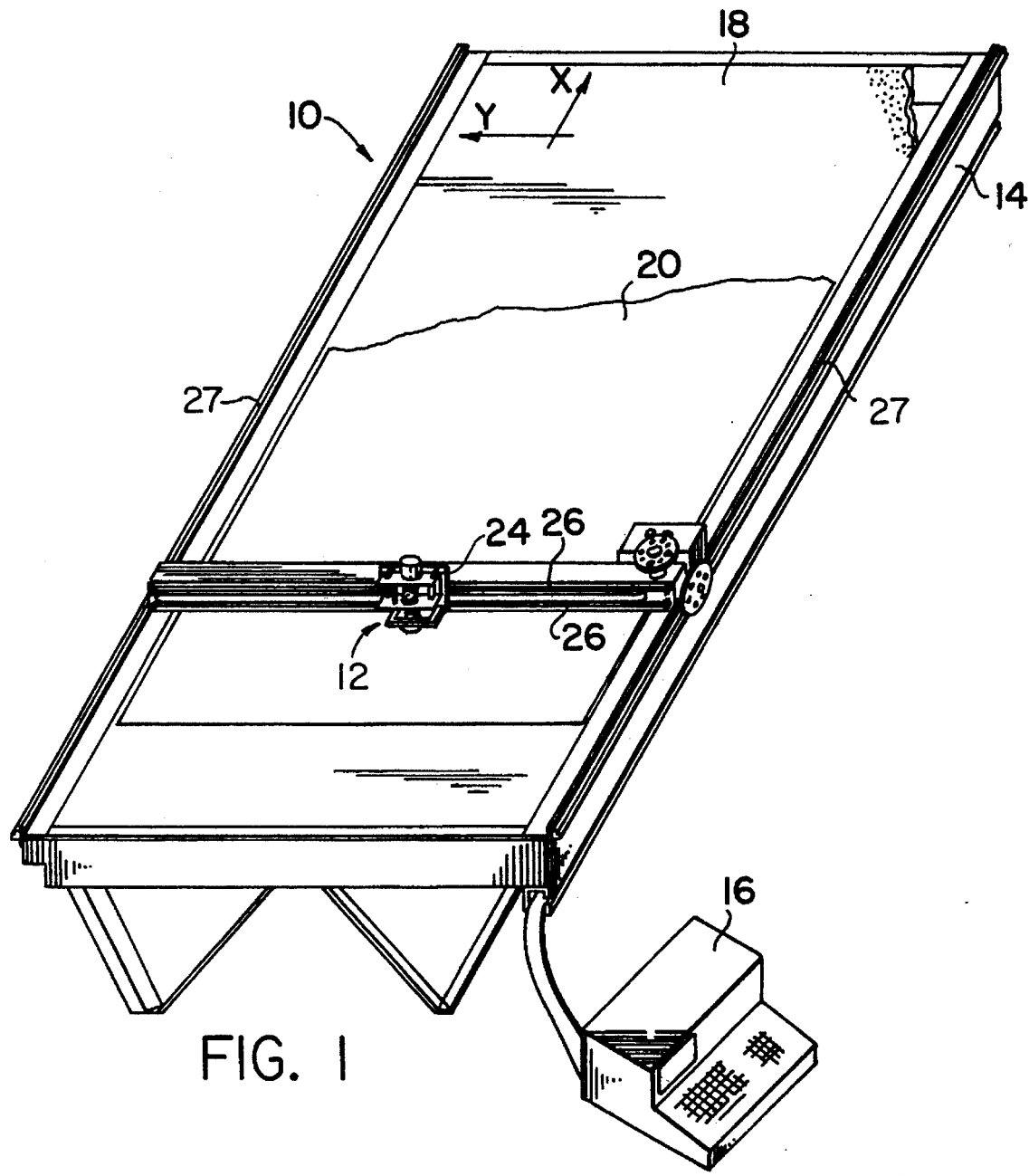
FIG. 1 is a perspective view showing a cutting machine of the type in which the invention may be employed.

FIG. 1 illustrates a cutting apparatus generally designated as 10 in which a cutting head 12 is employed. The cutting apparatus is comprised of a cutter table 14 having a penetrable support surface 18 on which is supported sheet material 20 to be cut by the cutter head 12. The sheet material 20 is spread on the surface 18 either as a single or multiple ply layup. In the case where an automated cutting apparatus is used, a computer 16 is provided and commands drive motors coupled to the cutter head to controllably move the cutter head in the indicated X and Y coordinate directions during the course of a cutting operation.

The cutter head 12 includes a frame 38 which carries a reciprocating cutting blade 22 having a depending tip 23 defining its length, and has a given width dimension W and a given thickness dimension T. The cutter head 12 is mounted above the support surface 18 such that it is moveable along first ways 27, 27 which extend in the indicated X-coordinate direction and is supported for movement in the indicated Y-coordinate direction by a Y-carriage 24 disposed above the table 14 and moveable along second ways 26, 26 to controllably position the cutter head above the support surface 18 at designated points along the surface 18. The support surface 18 provides a permeable bed which supports the material 20 in a substantially planar condition, yet allows the knife tip 23 to plunge through the material 20 and below the surface 18 with each stroke it makes.

Figure 3:
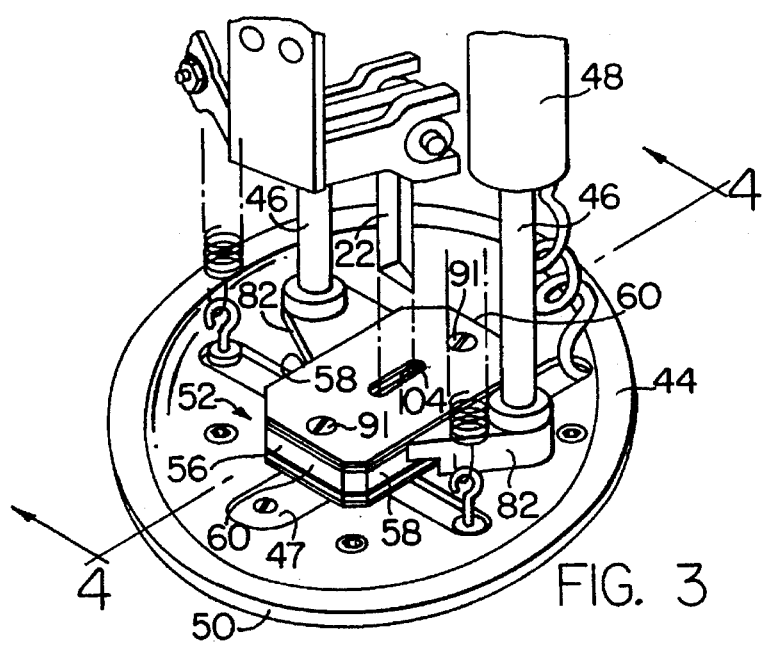
FIG. 3 is a partially fragmentary perspective view of a presser foot on which a means for treating the cutting blade surfaces is disposed.

The blade 22 of the cutter head 12 has a leading edge 28 defined by two angled surfaces 30 and 32 which are maintained in a sharpened condition by a sharpening means 31. This means comprises two grinding stones 34 and 36 each rotatably disposed on the frame 38 of the cutter head 12 and each being driven in rotation about respective rotational axes R and R' through the action of a planetary gear system which is described in further detail in aforementioned U.S. Pat. No. 4,033,214. The grinding stones 34 and 36 have outwardly disposed faces 40, 42 which are juxtaposed relative to the blade 22 and are intermittently caused to engage the opposed one of the angled surfaces 30 and 32 of the blade during a sharpening operation to effect sharpening along the leading edge 28. The cutter head 12, as seen in FIG. 3, also includes a presser foot 44, slidably vertically connected to the cutter head 12 through the intermediary of slide rods 46, 46 which are received within receiving parts 48, 48 of the frame 38. The presser foot is slid along the material surface to locally compress the underlying layup and is aided in this process by an annular chamfer 50 disposed about its circumference.

In accordance with the invention as shown in FIG. 3, a reservoir means 52 is provided and is secured to the presser foot 44 for lubricating a portion of the knife blade 22 as it is reciprocated through each stroke in order to treat the surfaces of the blade 22 so as to keep them free from adhesive otherwise adhering to them, as in the case where an adhesive laminate is being cut. This reservoir means includes a generally rectangular cage member 56 defined by long sides 58,58 extending parallel to the width dimension W of the knife blade and by short sides 60, 60 extending perpendicularly to the long sides 58, 58 and parallel to the thickness T dimension of blade 22. Integrally formed with the long and short sides of the cage member is a substantially planar top portion 70 which combines with the sidewalls to create a chamber 66 which is downwardly opened. The top portion 70 of the cage member contains a slot 74 whose elongate extent extends parallel with the long sides 58 and whose shorter extent extends parallel to the short sides 60, 60 of the cage member. The slot 74 is slightly oversized relative to the respective knife blade dimensions so as to allow it to pass through the cage member without interference. Surrounding the slot 74 within the chamber 66 is a central region 72 having an increased depth taken relative to the thickness otherwise found in the remainder of the top portion 70 of the cage member. The region which surrounds the slot 74, as will be discussed in detail later, has a given geometry which permits the reinsertion of the blade 22 into the cage member 56 without obstruction.

The cage member 56 is maintained in alignment with the stroke action line L of the blade 22 through the intermediary of two wing members 82, 82 each respectively integrally connected with one of the long sides 58, 58 of the cage member. The wing members for this purpose may include through openings 84, 84 correspondingly sized and shaped to receive the respective ones of the sliding rods 46, 46 which connect at the distal ends thereof to the presser foot 44. The cage member itself may be secured to the presser foot by tabs 47, 47 which extended outwardly from the base of the cage member and attach to the presser foot in a conventional manner.

Figure 4:
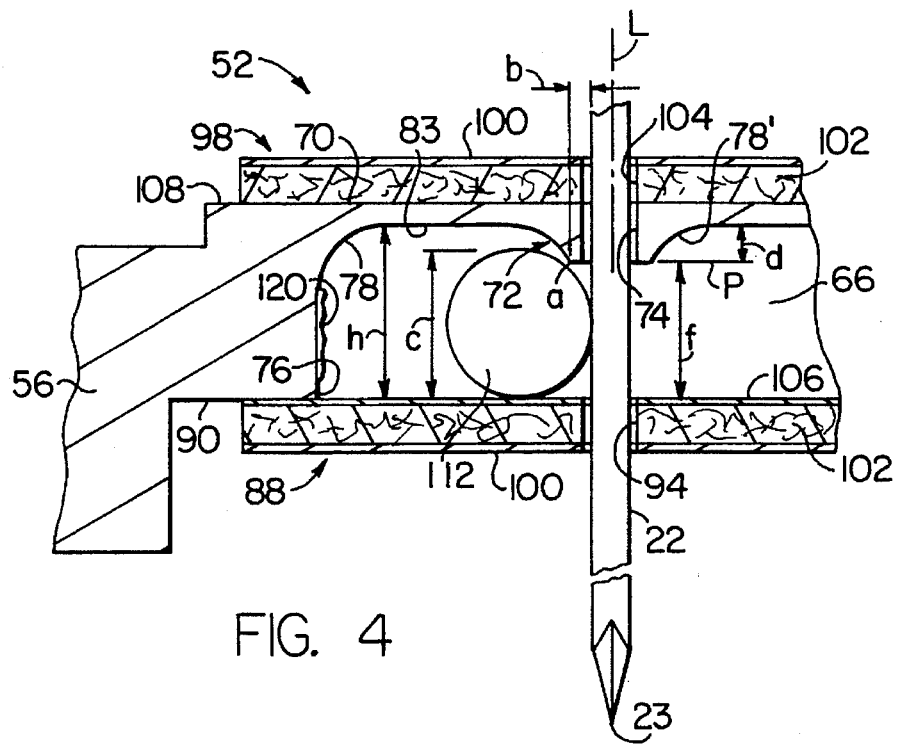
FIG. 4 is a partially fragmentary vertical section taken along line 4—4 in FIG. 3.
Figure 5:
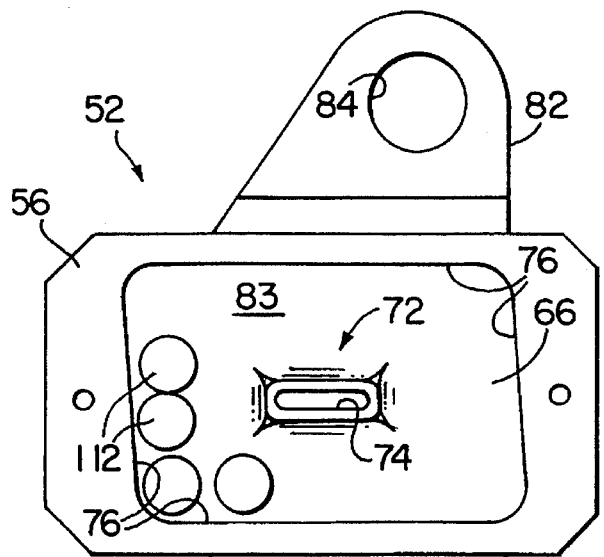
FIG. 5 is a view of the cage member looking at it from the bottom with the lower cover member taken away to reveal the enclosed spherical members.

Referring to FIGS. 4 and 5, it should be seen that the interior of the chamber 66 is defined by a contiguous interior surface which follows the generally rectangular shape defined by the long and short sides of the cage member. This interior surface is defined by upstanding sidewall portions 76, 76, a ceiling portion 83 which are continuous with one another through the intermediary of arcuate connecting portions 78, 78 which blend orthogonally disposed ones of the surface portions with one another along a uniform radius of curvature. The chamber 66 is enclosed at its bottom by a lower closure member 88 which is seated against the bottom face 90 of the cage member and is maintained in this position by suitable fastening devices, such as, for example, by a nut and bolt connection. Formed in the lower closure member 88 is a second elongate slot 94 which is aligned coincidentally with the stroke line of action L of the blade 22 and with the slot 74 formed in the top portion 70 of the cage member. The cage member top surface 108 is substantially planar and supports an upper closure member 98 which fastened against movement to this surface by conventional means, such as by screws 91. The upper closure member 98 includes a third elongate slot 104 similarly sized and configured to that of the first and second slots and likewise coincidentally aligned with the stroke line of action L of the knife blade 22.

Each of the upper and lower closure members 88 and 98 is comprised of at least one rigid outer retaining plate 100 and a substantial flat wiper piece 102 disposed inwardly thereof. The top surface 108 of the cage member being substantially flat supports the wiper piece 102 of the upper closure member 98 thereby eliminating the need for a second rigid plate to be used to support the opposite side of the wiper material as in the case with the lower closure member 88 wherein there is no supporting surface provided, thereby requiring an inner retainer plate 106 to be used. It is necessary to maintain the wiper piece 102 between two rigid surfaces because this material, in the preferred embodiment, is formed from a somewhat limp felt material and could not otherwise maintain itself in a stable condition. Additionally, slits are formed in wiper pieces 102, 102 which allow the blade to move through the material, but are sufficiently narrow to have a wiping effect on the blade cutting surfaces in accordance with one aspect of the invention.

Enclosed within the chamber 66 are a plurality of spherical members 112, 112 which are therein contained by the lower closure member 88 and are provided for the purpose of dispersing onto the surfaces of the blade 22 a likewise enclosed lubricant 120 otherwise accumulating on the interior walls of the chamber 66. The action of the spherical members about the blade 22 is limited by the presence of the centralized region 72 which surrounds the slot 74. This localized region has an increased depth d taken relative to the remaining ceiling surface portion of the chamber 66 so as to prevent the spherical members from significantly interfering with the passage created for the knife blade along line L in the cage member. The dimension d is defined by a plane P which truncates the otherwise downwardly sloping curved surface 78' which surrounds the slot 74. The intersection between the curved surface 78' and the plane P, defines an edge a which is laterally offset from the most proximate inner wall of the slot so as to allow only a portion b of each spherical member to be introduced into the passage defined by the slot 74.

Taken from the upper surface of the inner retaining plate 106, the chamber 66 thus has a chamber height h with the plane P being disposed a distance or central height f from this surface. The diameter c of each spherical member selected is such that it is greater than the dimension f but smaller than the height dimension h of the chamber. Thus, the centralized region 72 of the cage member prevents the spherical members from completely obstructing the knife passage so that for sharpening purposes, the lower portion of the knife can be completely withdrawn from the chamber 66 without concern that a sphere will block the return of the tip 23 after the sharpening procedure is finished. By way of example, the following is a list of exemplary values for the dimensions discussed above:

b=0.028 inch h=0.285 inch c=0.250 inch f=0.218 inch

The lubricant 120 used is particularly well adapted for use in a cutter head wherein fabric material is being cut and must not be soiled by any substance used in the operation of the cutting machine. For this purpose, the lubricant 120 is provided as a gel and is given a prescribed viscosity which maintains it within the confines of the chamber 66 thereby preventing it from leaking from within these confines except for leaving a slight film on the surfaces of the knife blade through the wiping action of the material 102. The following are examples of a lubricant with properties suitable for such use.

TABLE A-1

| Material | Composition by Percent Weight | Viscosity |
|---|---|---|
| Type "A" | 67% Silicone 33% Polytetrafluoroethylene | 500 cst @77° F. |
| Type "B" | 62% Silicone 38% Polytetrafluoroethylene | 25000 cst @77° F. |

The lubricant of type "A" is less viscous than that of type "B" thus making it well suited for application onto the surfaces of the blade when applied through the cage member 56. Dispersion of the lubricant 120 onto the blade 22 from the interior surfaces of the chamber 66 is accomplished by the rolling or the otherwise sliding action of the spherical members 112 which are caused to shift in this way by the change in direction of the cutter head as it moves along a path of cut. That is, the cutter head gains significant momentum during the course of a cutting operation, and it is this momentum, especially as the cutter head changes direction, which causes the spherical members to shift within the cage member. In so doing, these members gather lubricant from the interior surfaces of the chamber 66 and transfer the same to the cutting blade when the spheres contact the blade surfaces in the manner illustrated in FIG. 4.

Figure 2:
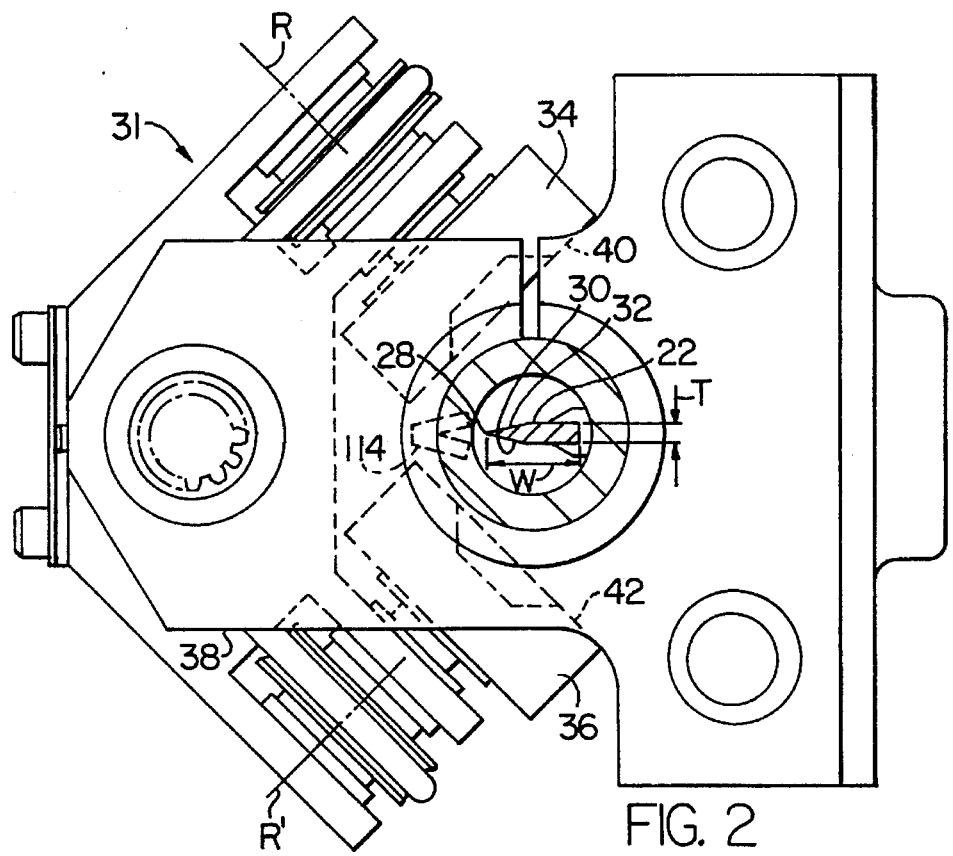
FIG. 2 is a partially fragmentary horizontal view taken through a cutter head frame to reveal the sharpening mechanism.

Returning now to FIG. 2 it should be seen that pads 114, 114 may be provided on the frame 38 of the cutter head which carry a lubricant of a heavier grade, for example, as set forth as type "B" in table 1A, which is suitable for application onto the grinding stones. It is noted that the grinding stones are brought into engagement with the cutting blade in the manner discussed in aforementioned U.S. Pat. No. 4,033,214. The viscosity of the type "B" lubricant is well suited for application onto the grinding stones 34 and 36, thereby likewise keeping these surfaces free from adhesive buildup in the event that small amounts of adhesive are transferred to the grinding stones during a sharpening operation from the surfaces of the cutting blade.

By the foregoing, a system for treating the surfaces of a cutting blade to keep them free from an adhesive or other foreign material transferred from the sheet material being cut is disclosed by way of the illustrated example. However numerous modifications and substitutions may be had without departing from the spirit of the invention. For example, while the lubricant disclosed in the Table A1 is shown used in cooperation with a reciprocating cutting blade, it is nevertheless in keeping with the spirit of the invention to use such a lubricant with other cutting implements, such as, in association with a drag blade, rotary or scissors-type cutters.

Accordingly, the invention has been described by way of illustration rather than limitation.

I claim:

1. A cutting apparatus for cutting sheet material having adhesive applied thereto, said apparatus comprising:

a cutter head including a frame;

a knife blade having cutting surfaces defining a cutting edge, the knife blade carried by said frame moveable between discrete positions to cut said sheet material; and means for keeping the cutting surfaces of the knife blade free of adhesive buildup including;

(a) a reservoir means secured on said frame adjacent to said knife blade, said reservoir means defining a chamber;

(b) a non-liquid gel lubricant contained within said chamber; and (c) spherical means positioned within said chamber for applying said lubricant onto at least a portion of the cutting surfaces of the knife blade.

2. The apparatus of claim 1 wherein the knife blade is a reciprocating knife blade, and the means for applying lubricant applies lubricant to at least a portion of the cutting surfaces of the knife blade with each stroke of the knife.

3. The apparatus of claim 2 wherein the reservoir means secured to the frame comprises a cage member enclosing a chamber therein, said cage member having a top portion and a bottom face, and a lower closure member mounted to the bottom face, each of said top portion and said lower closure member having a slot formed therein, said slots being co-aligned, and each of said slots having an elongate extent and a shorter extent.

4. The apparatus of claim 3 wherein the chamber encloses at least one spherical member for engaging at least one surface of the knife blade.

5. The apparatus of claim 4 wherein said cage member has a generally rectangular shape having long sides and short sides, the long sides extending generally parallel to the elongate extents of the slots formed in the top portion of the cage member and the lower closure member, and the short sides extending generally parallel to the shorter extents of said slots, the elongate and shorter extents of each slot corresponding respectively to the width and thickness dimensions of the knife blade.

6. The apparatus of claim 5 wherein the cage member further comprises a centralized region extending about the slot formed in the top portion of the cage member, said centralized region depending from said top portion a given dimension such that said top portion has a first height taken from the lower closure member and said centralized region has a second height taken from the lower closure member.

7. The apparatus of claim 6 wherein said spherical member has a given diameter which is less than said first height and greater than said second height.

8. The apparatus of claim 5 wherein said cage member opens downwardly and said lower closure member encloses the otherwise open chamber defined by said long and short sides and by said top portion of said cage member.

9. The apparatus of claim 8 wherein said cage member has a substantially flat upper outer surface supporting an upper closure member having a slot formed therein, said slot being aligned with the slot formed in the top portion of the cage member.

10. The apparatus of claim 9 wherein:

said upper enclosure member is comprised of an outwardly disposed rigid retaining plate and an inwardly disposed layer of wiper material disposed adjacent the flat upper outer surface of said cage member;

said lower closure member comprises two rigid retaining plates having a layer of wiper material disposed therebetween; and the slots formed in each of said upper and lower closure members are aligned with said slot in said top portion of said cage member.

11. The apparatus of claim 10 wherein the wiper material of each of said upper and lower closure members include slits to effect wiping of said knife blade as it is reciprocated.

12. The apparatus of claim 1 wherein said non-liquid lubricant gel comprises a composite material formed approximately from 33% by weight of polytetrafluoroethylene and 67% by weight of silicone.

13. A method of cutting sheet material having adhesive applied to at least one surface thereof, said method comprising the steps of:

providing a cutting implement having cutting surfaces capable of cutting the sheet material;

providing a reservoir with a chamber therein;

providing within said chamber a lubricant in a non-liquid gel form and a dispersing means, which includes spherical members, for dispersing the lubricant onto the cutting surfaces of the cutting implement to treat the cutting surfaces by applying a thin film of said lubricant to said cutting surfaces as the cutting implement is reciprocated through the reservoir to prevent amounts of the adhesive from otherwise adhering to and building up on the cutting surfaces of the cutting implement during a cutting operation;

providing upper and lower slots in said reservoir; and reciprocating the cutting element to cut the material, wherein the step of reciprocating includes reciprocating the cutting surfaces through the slots and said chamber of said reservoir so that the cutting surfaces of the cutting implement are treated with said lubricant by contact between the spherical members and the cutting surfaces to transfer a portion of said lubricant onto the cutting surfaces and prevent the adherence and building up of adhesive on the cutting surfaces.

14. The method as defined in claim 13 further characterized in that said lubricant in gel form comprises 33% by weight of polytetrafluoroethylene and 67% by weight of silicone.

15. The method as defined in claim 13 further characterized by the steps of:

providing means for sharpening the cutting implement;

intermittently using said means for sharpening to sharpen said cutting implement;

providing at least one pad carrying a second lubricant in gel form; and moving said means for sharpening and said at least one pad into contact with one another to transfer a portion of said second lubricant onto said means for sharpening to maintain said means for sharpening free from adhesive buildup.

16. The method as defined in claim 13 further characterized by the steps of:

providing a wiping means at said upper and lower slots such that the reciprocating cutting implement moves relative to said wiping means to wipe the cutting surfaces of said cutting implement.

17. A cutting apparatus including a knife blade for cutting sheet material of the type which leaves deposits of the material on the knife blade during a cutting operation, said apparatus comprising:

means for keeping the knife blade free of material buildup including;

(a) a reservoir positioned adjacent to said knife blade, said reservoir defining a chamber;

(b) a non-liquid gel lubricant contained within said chamber; and (c) spherical means positioned within said chamber for applying said lubricant onto at least a portion of the knife blade.

* * * * *